United States Patent
Rosenfeldt et al.

(10) Patent No.: US 6,606,158 B2
(45) Date of Patent: Aug. 12, 2003

(54) DETERMINATION OF A PROPERTY OF AN OPTICAL DEVICE

(75) Inventors: Harald Rosenfeldt, Hamburg (DE); Greg Van Wiggeren, Los Gatos, CA (US); Douglas M. Baney, Los Altos, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 170 days.

(21) Appl. No.: 09/940,741

(22) Filed: Aug. 28, 2001

(65) Prior Publication Data

US 2002/0113972 A1 Aug. 22, 2002

(30) Foreign Application Priority Data

Nov. 17, 2000 (EP) ............................................. 00125089

(51) Int. Cl.[7] .................................................. G01B 9/02
(52) U.S. Cl. ....................... 356/477; 356/73.1; 356/491
(58) Field of Search .............................. 356/73.1, 477, 356/491, FOR 113; 250/227.17

(56) References Cited

U.S. PATENT DOCUMENTS 4,750,833 A * 6/1988 Jones .......................... 356/73.1
5,717,489 A     2/1998 Ozeki et al.
5,852,496 A    12/1998 Gisin et al.

OTHER PUBLICATIONS

De Buyzer. H.. Examiner. European Search Report, Application No. EP 00 12 5089. dated Apr. 24, 2001.

* cited by examiner

Primary Examiner—Samuel A. Turner
Assistant Examiner—Patrick Connolly

(57) ABSTRACT

A method and an apparatus for determination of properties, e.g. of elements of the Jones matrix of an optical device under test, comprising the steps of: producing an incoming light beam, splitting the light beam into a first light beam and a second light beam, coupling the first light beam, preferably having two parts delayed with respect to each other, with a given initial polarization into the optical device under test, letting the second light beam travel a different path than the first light beam, superimposing the first light beam and the second light beam to produce interference between the first light beam and the second light beam in a resulting superimposed light beam, splitting the superimposed light beam into a third light beam polarization dependent and a fourth light beam, detecting the power of the third and the fourth light beam as a function of frequency when tuning the frequency of the incoming light beam over a given frequency range, deriving optical properties, e.g. elements of the Jones matrix, from the frequency dependency of the detected power.

30 Claims, 10 Drawing Sheets

DETERMINATION OF A PROPERTY OF AN OPTICAL DEVICE

BACKGROUND OF THE INVENTION

The present invention relates to determination of a property of an optical device under test, e.g. the determination of the elements of the Jones Matrix of an optical device. The Jones matrix contains information about the optical properties of the device under test, which can be a fiber or an optical component. Knowledge of the Jones matrix of an optical component enables determination of many important optical properties of the component, such as insertion loss, reflectivity or transmissivity, polarization dependent loss (PDL), and polarization mode dispersion (PMD).

PMD is a fundamental property of single mode optical fiber and components in which signal energy at a given wavelength is resolved into two orthogonal polarization modes of slightly different propagation velocity. The resulting difference in propagation time between polarization modes is called the differential group delay, or DGD. The term PMD is used to denote the physical phenomenon in general and the mean, or expected, value of DGD in particular. The attributes that define PMD are DGD, and the principal states of polarization, or PSP. Both are generally functions of wavelength in single mode fiber systems. Long fibers typically exhibit random polarization coupling, and consequently, PMD scales with the square root of fiber length for fibers longer than several kilometers. State of the art fiber may be limited to a few tenths of picoseconds of DGD per root kilometer. Additionally, state of the art components for such fiber communication systems may exhibit only tenths of picoseconds of DGD.

PMD causes a number of serious capacity impairments, including pulse broadening. In this respect its effects resemble those of a chromatic dispersion, but there is an important difference. Chromatic dispersion results from a variation in propagation delay with wavelength caused by the interplay of fiber material and dimensions and is a relatively stable phenomenon. The total chromatic dispersion of a communications system can be calculated from the sum of its parts, and the location and value of dispersion compensators can be planned in advance. In contrast, the PMD of single mode optical fiber at any given signal wavelength is not stable, forcing communications system designers to make statistical predictions of the effects of PMD and making passive compensation impossible. Moreover, PMD becomes a limiting factor after chromatic dispersion has been sufficiently reduced.

This is because the channel PMD, i.e. the mean value of DGD for the fiber over wavelength and time, also called the expected value, can often be in excess of 20 ps. This value is within the bit resolution of a 40 Gbit/s communication system, and as a result, the communication system is adversely affected by the PMD. Additionally, in state of the art communication systems components are often introduced in cascades, e.g. by introducing a cascade of a great number of Bragg gratings in the fibers. Although the single component of such a cascade may exhibit only tenths of picoseconds of DGD the total cascade may exhibit DGDs which reach the resolution of the transmission rate. Therefore, it becomes more and more necessary to be able to gain exact information about the PMD of each single component.

The aforementioned problem has inspired the development of many measurement methods to measure PMD. In the following a few methods of the known methods shall be discussed.

In the fixed analyzer PMD measurement method PMD is determined statistically from the number of peaks and valleys in the optical power transmission through a polarizer as wavelength is scanned. A polarizer placed directly before a detector is referred to as an analyzer, hence the name of the method. The fixed analyzer response may be Fourier transformed to yield a spectrum that gives insight into the degree of mode coupling and allows calculation of PMD from a Gaussian fit or from the second-moment algorithm. The problem with the fixed analyzer method is that it is not possible to measure the PMD of components which exhibit band widths which are smaller than the variation in the optical power transmission over wavelength.

Another method is the interferometric method, which determines PMD from the electric field autocorrelation function using a broad band source. The value of PMD is computed with an algorithm based on the second moment. The problem of this method is that it only produces exact values of PMD when the PMD is caused by pure birefringence. However, this method is not able to produce useful PMD values when the PMD is wavelength dependent.

Another method is the so called Poincaré arc or SOP (state of polarization) method, which uses a polarimeter to capture the arc traced out on the poincaré sphere by the output polarization of the test device over a series of wavelength increments. However, if the polarized light is coupled accidentally into the main state of polarization of the test device no PMD can be measured. Another problem is that a high-resolution polarimeter is necessary which kind of polarimeters tend to be very expensive. Moreover, with this method no chromatic dispersion can be measured.

Another method is the so called Jones matrix eigenanalysis or JME method. This method determines DGD and PSP as functions of wavelength from measurements of the transmission matrix at a series of wavelengths. Again, this method uses an expensive polarimeter. This method gives no information about chromatic dispersion, neither.

Finally, there are methods known which measure the PMD more or less on a direct way. These methods, e.g. the modulation phase method and the pulse-delay methods determine PMD from measurements of the change in modulation phase and the change in pulse arrival time, respectively, between the principal states of polarization. The drawback of these methods is the pulse shape dependency of the results.

SUMMARY OF THE INVENTION

Therefore, it is an object of the invention to enable an improved determination of properties of an optical device.

The object is solved by the independent claims.

An advantage of the present invention is the possibility of deriving transmissive and reflective properties, e.g. the PMD of the device under test (DUT) just by determining the elements of the Jones matrix (which will be explained in more detail further below) of the DUT without need to make use of an expensive polarimeter, and the possibility of simultaneously measuring the chromatic dispersion of the DUT. So all the above-mentioned problems in the prior art can be avoided by the present invention. Moreover, it is possible to derive additional information from the derived Jones Matrix of the DUT. The present invention is capable of determining from the Jones matrix of a DUT as a function of wavelength during just one measurement. From the measured Jones matrix, it is possible to determine the insertion loss, reflectivity or transmissivity, polarization dependent loss (PDL), group delay, chromatic dispersion, differential group delay, principal states of polarization, and higher-order PMD parameters.

It is preferred to use a Jones Matrix. The information in the Jones matrix can be represented in several different ways, one alternative is called the Mueller matrix, which carries nearly the same information as the Jones matrix but represents it in a 4×4 matrix with all real elements. However, absolute phase properties and consequently chromatic dispersion cannot be described by the Mueller matrix. There are other ways to achieve the same goal. One topic of the invention is a way to measure PMD, PDL, PSPs, DGD, group delay, chromatic dispersion, etc. with the interferometric method and apparatus described. However, it is possible to perform the inventive derivation with other tensors than with the Jones Matrix.

The term "coherent" in this application means that the coherence length of the incoming light beam is bigger than the difference of lengths of the paths of the light beams to be superimposed.

In a preferred embodiment of the invention the apparatus contains a first Mach-Zehnder interferometer whereby a polarization setting tool is placed in the measurement arm so that the laser light couples into the DUT with a defined polarization. This direction of polarization is then defined as the x-axis of the coordinate system of the Jones matrix calculus. Accordingly, the first two elements of the Jones matrix can easily be derived. In a second run of the inventive method the other two elements of the Jones matrix are derived with the same interferometer by changing the direction of polarization of the light beam incident on the DUT. It is preferred for ease of evaluation the results to change the polarization to a polarization orthogonal with respect to the former polarization. In this respect, it is further preferred that the initial polarization is linear and the changed polarization is changed by 90° with respect to the initial polarization.

In a further preferred embodiment the second run of the inventive method to determine the other two elements of the Jones matrix is not necessary. The Jones matrix is completely determined with just one run. For a complete acquisition of the Jones matrix it is necessary to test the DUT with two orthogonal input polarizations. Therefore, in this preferred embodiment a so-called "single scan" measurement concept is proposed. In this concept a polarization delay step generates two, preferably orthogonal, polarized signals which are delayed with respect to each other. The polarization delay-step provides two polarization states which are fed simultaneously into the DUT and which are "coded" by different propagation delays. Preferably, to delay the two signals with respect to each other the first light beam is split into a first undelayed light beam and a first delayed light beam in the polarization delay step. Subsequently both polarizations or parts of the first light beam are superimposed with the light of the local oscillator, i.e. the second light beam. Preferably, the two parts of the first light beam are orthogonal polarized with respect to each other so that they do not interfere when being superimposed. However, the two polarizations create interference patterns when being superimposed with the second light beam. Because of the delay introduced by the polarization delay step, the detected interference signals will have two distinct frequencies. These interference frequencies can be individually isolated and analyzed using electronic or digital filters. The analysis performed enables a determination of the elements of the Jones matrix of the optical device. There are many advantages linked to the aforementioned embodiment of the single-scan concept. First of all it is possible in the embodiments in which two scans are performed that the DUT changes its optical properties during the time between scans. Therefore, the stability requirements of the DUT are quite high. Moreover, performing two scans requires a lot of time so that with the single-scan concept the measurement speed can be increased dramatically. Furthermore, the measurement accuracy can be impaired by vibration noise, phase noise or a disturbance of the optical source between the measurements. This is also avoided by present embodiment. As a further advantage of the present embodiment the required precision with which each datum is assigned a frequency is less than the precision required in the other embodiments performing two scans since in this embodiment the two scans are performed simultaneously and therefore both relate to a certain frequency of the laser source.

It is clear for the skilled person that many other methods for splitting the first light beam, delaying one part with respect to the other part of the first light beam, and recombining them with different, preferably orthogonal, polarizations could be imagined.

In a respective polarization delay unit to perform the polarization delay step there are preferably used two polarization beam splitters, one to split the first light beam in the first delayed and in the first undelayed light beam, and the second to recombine the first delayed and the first undelayed light beam. The two polarization beam splitters each having two ports are connected with each other by polarization maintaining fiber. One of these two fibers is longer than the other to create the aforementioned delay of one part of the split first light beam. Alternatively, the recombining polarization beam splitter can be replaced by a polarization maintaining coupler.

In another preferred embodiment of either the double or single scan methods, there is a second Mach-Zehnder interferometer parallel to the first one. In this second interferometer the same coherent laser beam of the laser source is coupled in by a beam splitter before these two interferometers. With the help of the second interferometer, which is a reference interferometer without an optical device in its measurement arm, any errors in the detected powers of the resulting beams of the first interferometer caused by a nonlinearity in the scanning velocity when scanning the frequency of the laser can be eliminated.

Instead of using a second interferometer it is possible to use the second port of the second polarization beam splitter which recombines the two parts of the first light beam to couple out a signal to be used for the wavelength measurement. This is done by connecting this port directly with a polarizer which causes interference between the two parts of the first light beam, so that an interference pattern is provided to evaluate the scanning velocity when scanning the frequency of the laser source. Since the DUT is connected with the other port of the polarization delay unit, this port is not influenced by the DUT and can therefore be used as a reference. An advantage of this embodiment is that it does not need a second interferometer which reduces costs, necessary maintenance and the footprint of the inventive apparatus.

Other preferred embodiments are shown by the dependent claims.

It is clear that the invention can be partly embodied or supported by one or more suitable software programs, which can be stored on or otherwise provided by any kind of data carrier, and which might be executed in or by any suitable data processing unit. The software program is preferably used to evaluate the optical properties from the measured data.

BRIEF DESCRIPTION OF THE DRAWINGS

Other objects and many of the attendant advantages of the present invention will be readily appreciated and become better understood by reference to the following detailed description when considering in connection with the accompanied drawings. The components in the drawings are not necessarily to scale, emphasis instead being placed upon clearly illustrating the principles of the present invention. Features that are substantially or functionally equal or similar will be referred to with the same reference sign(s).

DETAILED DESCRIPTION OF THE INVENTION

Figure 1:
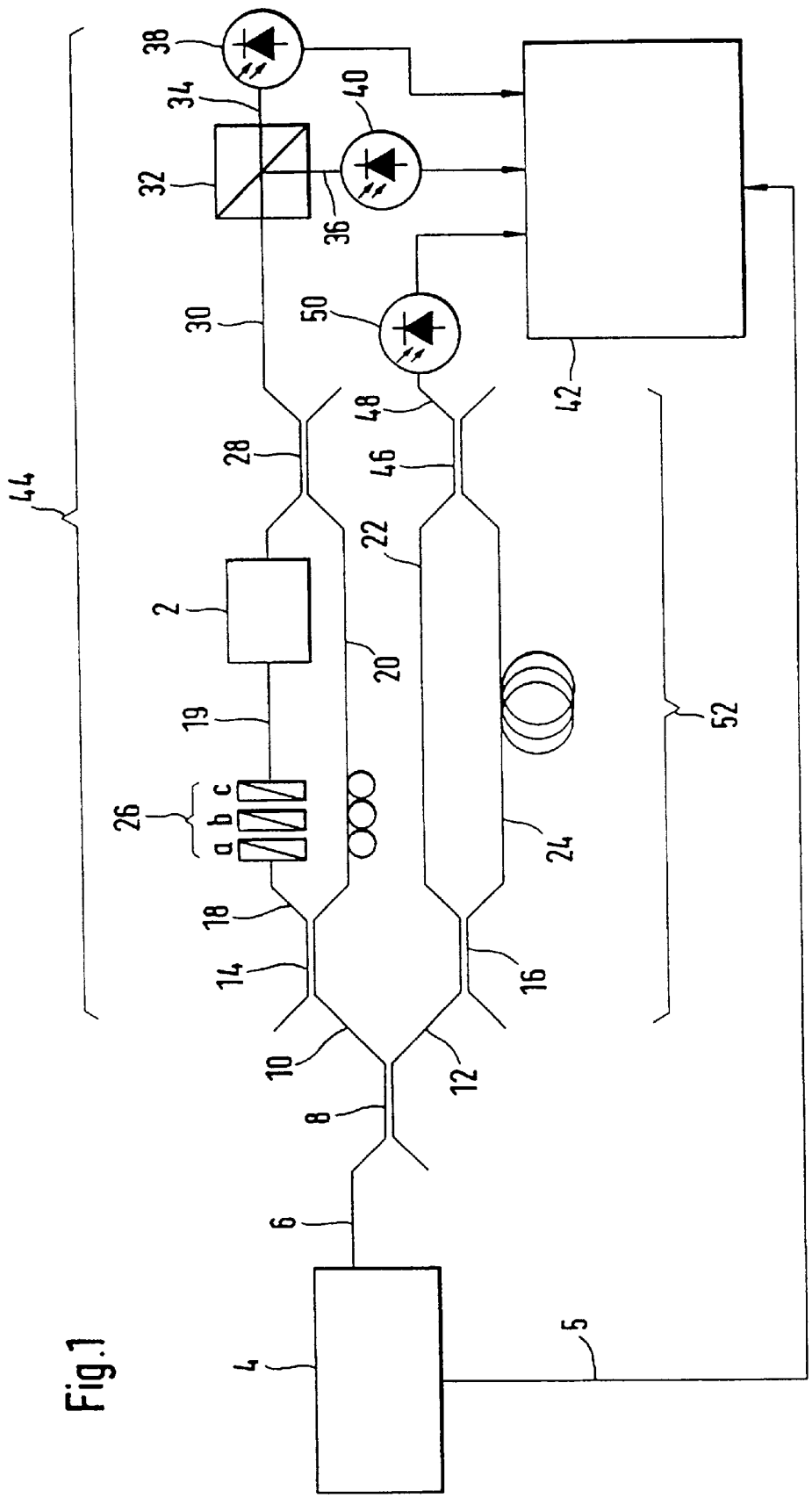
FIG. 1 shows a schematic illustration of a first embodiment of the apparatus of the invention.

Referring now in greater detail to the drawings, FIG. 1 shows a schematic illustration of a first preferred embodiment of an apparatus 1 for interferometric determination of the frequency-dependent Jones matrix of an optical transmission device under test (DUT) 2, according to the present invention. The apparatus 1 according to FIG. 1 and the respective method as described in the following is one mode of carrying out the invention. Other modes are described with respect to FIGS. 4–8. By means of the apparatus 1 shown in FIG. 1 the DUT 2, which is an optical component and can be a fiber, a Bragg grating or any other optical component or even air, is to be characterized in terms of its chromatic dispersion and its PMD. The apparatus 1 comprises as a signal source a tunable laser 4 which can be continuously tuned in respect of frequency. The laser 4 emits a coherent laser beam 6. The laser beam 6 is coupled into a first beam splitter 8 which splits the coherent laser beam 6 in a first incoming beam 10 and a second incoming beam 12. The first incoming beam 10 is coupled into a second beam splitter 14. The second incoming beam 12 is coupled into a third beam splitter 16. The second beam splitter 14 splits the first laser beam 10 into a third laser beam 18 and a fourth laser beam 20. The third beam splitter 16 splits the second laser beam 12 into a fifth laser beam 22 and a sixth laser beam 24.

The third laser beam 18 is coupled into a polarization controller 26 (which can be a Hewlett-Packard HP8169A) with three subunits 26a, 26b and 26c. By passing the polarization controller 26 the laser beam, now denoted by 19, is adjusted in its polarization and is coupled into the DUT 2. After passing the DUT 2 the laser beam 19 is reunited with the fourth laser beam 20. The fourth laser beam 20 has traveled a different optical distance (e.g. several meters) compared to the third laser beam 18 and the polarized laser beam 19 from the second beam splitter 14 to the fourth beam splitter 28. At the fourth beam splitter 28 the polarized laser beam 19 and the fourth laser beam 20 are superimposed to produce interference between the polarized laser beam 19 and the fourth laser beam 20, resulting in the first superimposed laser beam 30. The first superimposed beam 30 is then coupled into a polarization beam splitter 32 which splits the beam 30 into a seventh beam 34 and an eighth beam 36. Beam 34 is then coupled into a first photodiode 38. The beam 36 is coupled into a second photodiode 40. Polarization beam splitter 32, first photodiode 38 and second photodiode 40 build up a polarization diversity receiver. First photodiode 38 and second photodiode 40 transmit their outputs to an analog/digital-converter (ADC) 42 (which can be a National Instruments AT-MIO-16DE-10) connected to an evaluation unit (not shown) to evaluate the detected data.

Second beam splitter 14, third laser beam 18 and polarized laser beam 19, fourth laser beam 20 and fourth beam splitter 28 build up a Mach-Zehnder interferometer 44. The third laser beam 18 and the polarized laser beam 19 build up a measurement arm of the Mach-Zehnder interferometer 44. The fourth laser beam 20 builds up a reference arm of the Mach-Zehnder interferometer 44. The DUT 2 is disposed in the measurement arm of the Mach-Zehnder interferometer 44.

The fifth laser beam 22 and the sixth laser beam 24 travel a different optical distance before they are superimposed with a fifth beam splitter 46 since beam 24 travels a longer distance symbolized by loops 25. Exiting the fifth beam splitter 46 is a second superimposed beam 28 which is detected by a third photodiode 50. The third photodiode 50 outputs a respective signal to the analog/digital-converter (ADC) 42. The third beam splitter 16, the fifth laser beam 22, the sixth laser beam 24 and the fifth beam splitter 46 build up a reference interferometer 52 to the measurement interferometer 44. This reference interferometer 52 helps as a part of apparatus 1 eliminating a possible nonlinearity in time of the tuning velocity of the laser 4. For this purpose the output of the photodiode 50 is an input of ADC 42. ADC 42 thereby gets information about occurrence of any nonlinearity of the scan velocity of the laser 4. Based on this information this nonlinearity can be subtracted by the evaluation unit from the results of the measurements of the measurement interferometer 44.

The tunable laser 4 has a trigger output 5 which is input into the ADC 42 for triggering the ADC 42.

The inventive method works as follows:

By the polarization controller 26 the third laser beam 18 gets a defined polarization, resulting in the polarized laser beam 19. With this defined polarization the polarized laser beam 19 is coupled into the DUT 2. After passing the DUT 2 the polarized laser beam 19 is superimposed with the fourth laser beam 20, i.e. the reference arm of the Mach-Zehnder interferometer 44. The resulting first superimposed beam 30 is then coupled into the polarization beam splitter 32 which results in the seventh laser beam 34 and the eighth laser beam 36 which are orthogonal polarized components of beam 30. These orthogonal polarized beams 34 and 36 are detected by the photodiodes 38 and 40 and the respective output signals of the photodiodes 38 and 40 are received by the ADC 42. With the signals received by the ADC 42, the evaluation unit is able to determine with the calculus described below two (complex) elements of the Jones matrix of the DUT 2. The remaining two elements of the Jones matrix of the DUT 2 are obtained by changing the polarization of the polarized laser beam 19 with the polarization controller 26 and performing the aforementioned steps of the inventive method in a second run of the method (or by using the polarization delay step described below). The changed polarization of the thus resulting polarized laser beam (not shown) is preferably orthogonal to the polarization of the polarized laser beam 19 in the first run of the method. Thereby, it is possible to calculate the missing two elements of the Jones matrix of the DUT 2. Having the complete Jones matrix it is then very easy to derive transmissivity or reflectivity, DGD, PMD, PSPs, PDL or chromatic dispersion of the DUT 2.

To explain the determination of the differential group delay (DGD) by means of the Jones matrix, the following explanations show the used calculus to perform this determination.

The Jones Matrix U provides the relationship between the Jones vectors at the input $\vec{E}_a$ and at the output $\vec{E}_b$ of the DUT 2:

$$\vec{E}_b = U(\omega) \cdot \vec{E}_a,$$

where ω is the optical frequency of the input light. From the Jones matrix itself, one can determine the differential group delay (DGD), two principal states of polarization (PSPs), reflectivity or transmissivity, and polarization dependent loss (PDL). Using a conventional polarimeter, the phase relationship between the left-and right-hand side of the equation above is ambiguous, and this ambiguity prevents a determination of group delay, chromatic dispersion, etc. The present invention, however, enables determination of the proper phase relationship between the two sides of the equation, as well as the Jones matrix. Below, this information is used to calculate the group delays associated with each of two PSPs of a device.

If $\vec{E}_{a\pm}$ and $\vec{E}_{b\pm}$ are the (still unknown) principal states at the input and the output of DUT 2, respectively, it is possible, with this invention, to establish the following relationship:

$$\vec{E}_{b\pm} = e^{+j\tau_\pm \omega} \cdot U \cdot \vec{E}_{a\pm}.$$

$\vec{E}_{a\pm}$ and $\vec{E}_{b\pm}$ are to be standardized in such a way that their mean phase disappears: $\text{Im}\{E_x \cdot E_y\} = 0$. The principal states are in a first approximation independent of frequency. Therefore the following applies:

$$\frac{d\vec{E}_{b\pm}}{d\omega} = j\left(\tau_\pm + \omega \frac{d\tau_\pm}{d\omega}\right) e^{j\tau_\pm \omega} \cdot U \cdot \vec{E}_{a\pm} + e^{j\tau_\pm \omega} \cdot \dot{U} \cdot \vec{E}_{a\pm} \stackrel{!}{=} 0.$$

Since the group delay of the device, $\tau_g$, is given by the definition $$\tau_g = \tau + \omega \frac{d\tau}{d\omega},$$

the preceding expression can be rewritten as a generalized eigenvalue problem:

$$\dot{U} \cdot \vec{E}_{a\pm} = j\tau_{g\pm} \cdot U \cdot \vec{E}_{a\pm}.$$

The eigenvalues, λ, give:

$$\lambda_\pm = j \cdot \tau_{g\pm}.$$

Thus, the two group delays are just the imaginary part of the eigenvalues. The differential group delay (DGD) can be calculated directly, according to the equation:

$$DGD = \tau_+ - \tau_-$$

In order to be able to determine the Jones Matrix U, it is necessary (see above) to carry out two partial measurements with respectively orthogonal input polarizations $\vec{E}_{a1}$ and $\vec{E}_{a2}$ of the polarized laser beam 19. If those two input polarizations are used as base vectors for the Jones representation, then that would correspond to the following input vectors:

$$\vec{E}_{a1} = \begin{pmatrix} 1 \\ 0 \end{pmatrix} \cdot E_0, \quad \vec{E}_{a2} = \begin{pmatrix} 0 \\ 1 \end{pmatrix} \cdot E_0$$

The corresponding output vectors read as follows:

$$\vec{E}_{b1} = \begin{pmatrix} u_{11} \\ u_{21} \end{pmatrix} \cdot E_0, \quad \vec{E}_{b2} = \begin{pmatrix} u_{21} \\ u_{22} \end{pmatrix} \cdot E_0$$

The symbols $u_{mn}$ in that case denote the four elements of the Jones matrix. The light 20 coming from the reference arm can be described by the following Jones vector:

$$\vec{E}_r = \begin{pmatrix} \cos\varphi \cdot e^{-j\phi} \\ \sin\varphi \cdot e^{+j\phi} \end{pmatrix} \cdot e^{-j\tau_r \omega} \cdot E_0$$

In that case, $\tau_r$ denotes the group delay of the reference arm 20. For the sake of simplicity, it will be assumed hereinafter that the power is uniformly distributed to the two base states and there is not a relative phase difference between them (linearly polarized light is incident at 45° on the polarization beam splitter 32):

$$\vec{E}_r = \begin{pmatrix} 1 \\ 1 \end{pmatrix} \frac{1}{\sqrt{2}} e^{-j\tau_r \omega} \cdot E_0$$

The light incident on the detectors then affords, by virtue of superimposition with the measurement signal:

$$\vec{E}_{Det1} = \begin{pmatrix} E_{Det11} \\ E_{Det21} \end{pmatrix} = \begin{pmatrix} u_{11} + \frac{1}{\sqrt{2}} e^{-j\tau_r \omega} \\ u_{21} + \frac{1}{\sqrt{2}} e^{-j\tau_r \omega} \end{pmatrix} \cdot E_0$$

$$\vec{E}_{Det2} = \begin{pmatrix} E_{Det12} \\ E_{Det22} \end{pmatrix} = \begin{pmatrix} u_{12} + \frac{1}{\sqrt{2}} e^{-j\tau_r \omega} \\ u_{22} + \frac{1}{\sqrt{2}} e^{-j\tau_r \omega} \end{pmatrix} \cdot E_0$$

with $$u_{mn} = U_{mn} e^{j\Phi_{mn}}$$

the following applies in regard to the detector powers:

$$P_{mn} \sim |E_{Det,mn}|^2 / E_0 = \frac{1}{2} + U_{mn}^2 + \sqrt{2}\, U_{mn} \cos(\varphi_{mn} + \tau_r \omega)$$

On the assumption that the magnitude $U_{mn}$ changes markedly more slowly with frequency than the term $\cos(\Phi_{mn} + \tau_r \omega)$, it is possible to determine both $U_{mn}(\omega)$ and also $\Phi_{mn}(\omega)$ from the interference signal present at the detectors 38, 40. It is possible numerically to calculate the derivation $\dot{U}(\omega)$ from the matrix $U(\omega)$ and to derive there from as described above the DGD. In the case of real measurements, errors occur in particular in determining the absolute phase terms of $U(\omega)$. In that respect it can happen that the light of the reference arm 20 meets the polarization beam splitter 32 not linearly but elliptically ($\Phi \neq 0$). In addition it is problematical that the measurement is composed of two wavelength scans of the laser source 4. This problem can be overcome by the embodiments of FIGS. 4–8 using a polarization delay unit. Due to the aforementioned uncertainty, there is a phase error $\Phi_a$ in the first column of the Jones Matrix U and $\Phi_b$ in the second column. Instead of the matrix U the matrix $\tilde{U}$ is measured:

$$\tilde{U} = \begin{pmatrix} e^{j\phi} & 0 \\ 0 & e^{-j\phi} \end{pmatrix} \cdot U \cdot \begin{pmatrix} e^{j\varphi_a} & 0 \\ 0 & e^{j\varphi_b} \end{pmatrix}$$

As that is equivalent to an upstream-connected or downstream-connected polarization controller 26, this does not change anything in regard to the DGD derived there from. The resulting principal states however are different. No further corrections are therefore required to determine the DGD.

As a first attempt, the above-described method was used as described above by the inventor with the apparatus of FIG. 1 to measure as a DUT 2 a highly birefringent fiber (HiBi-fiber). The results can be seen in FIG. 2.

Figure 2:
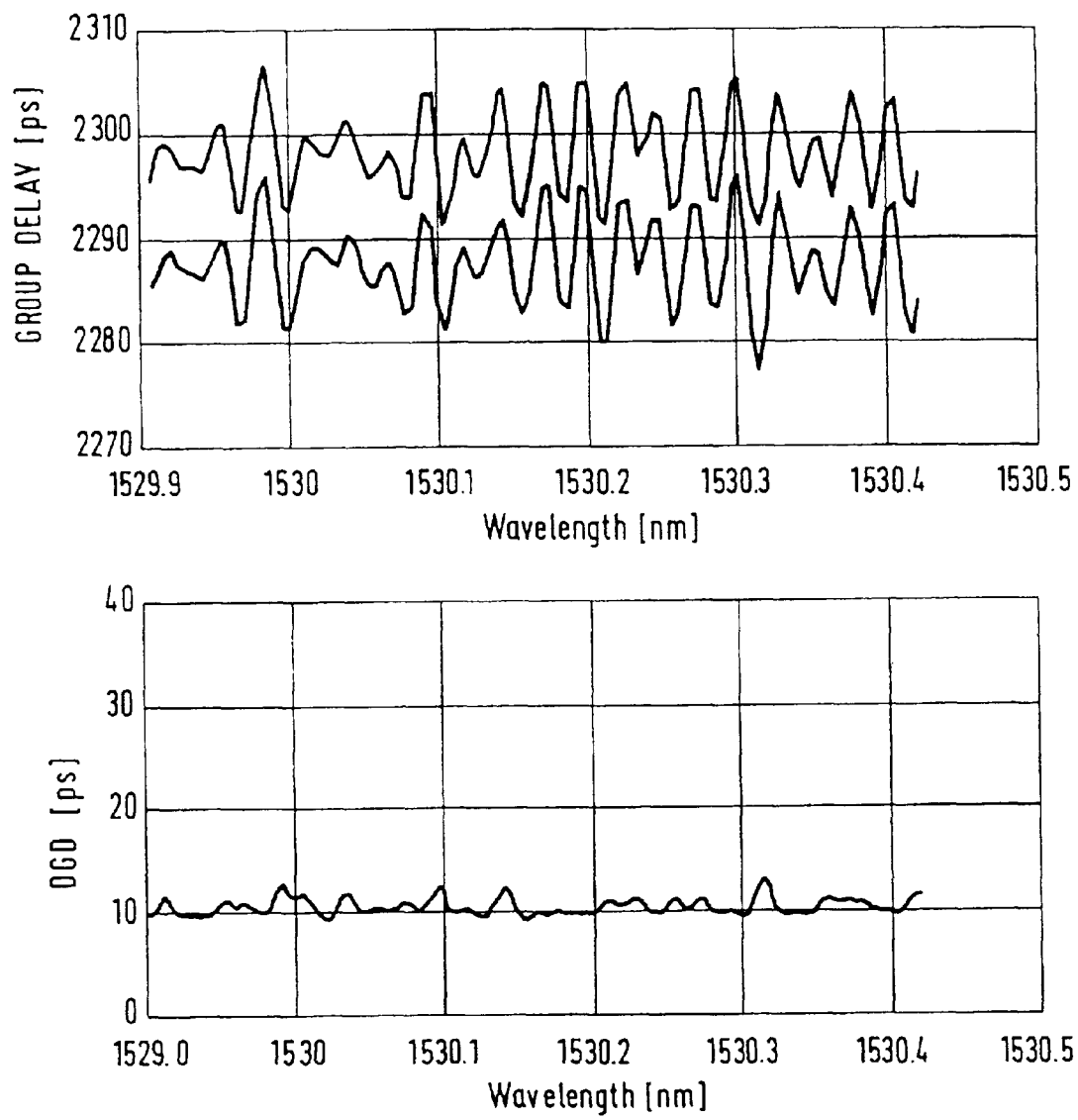
FIGS. 2+3 each show two graphs comparing PSP group delay with DGD with and without a device under test.

In FIG. 2 the upper plot shows the group delay of the two principal axes. The abscissa shows the wavelength in nm and the ordinate shows the group delay in ps. The lower plot shows the difference between the two group delays, the DGD in ps over the wavelength in nm. It can be seen that the DGD is very good at 10 ps while the absolute values fluctuate greatly over wavelength. One reason for this could be Fabry-Perot interference in the free-beam optical polarization controller 26 which was present in the measurement arm in addition to the DUT (see FIG. 1). It is possible under some circumstances to place the polarization controller 26 upstream of the second beam splitter 14 so that group delay fluctuations do not play any part. That however also has effects on polarization in the reference arm 20, which has to be considered in the evaluation procedure.

Figure 3:
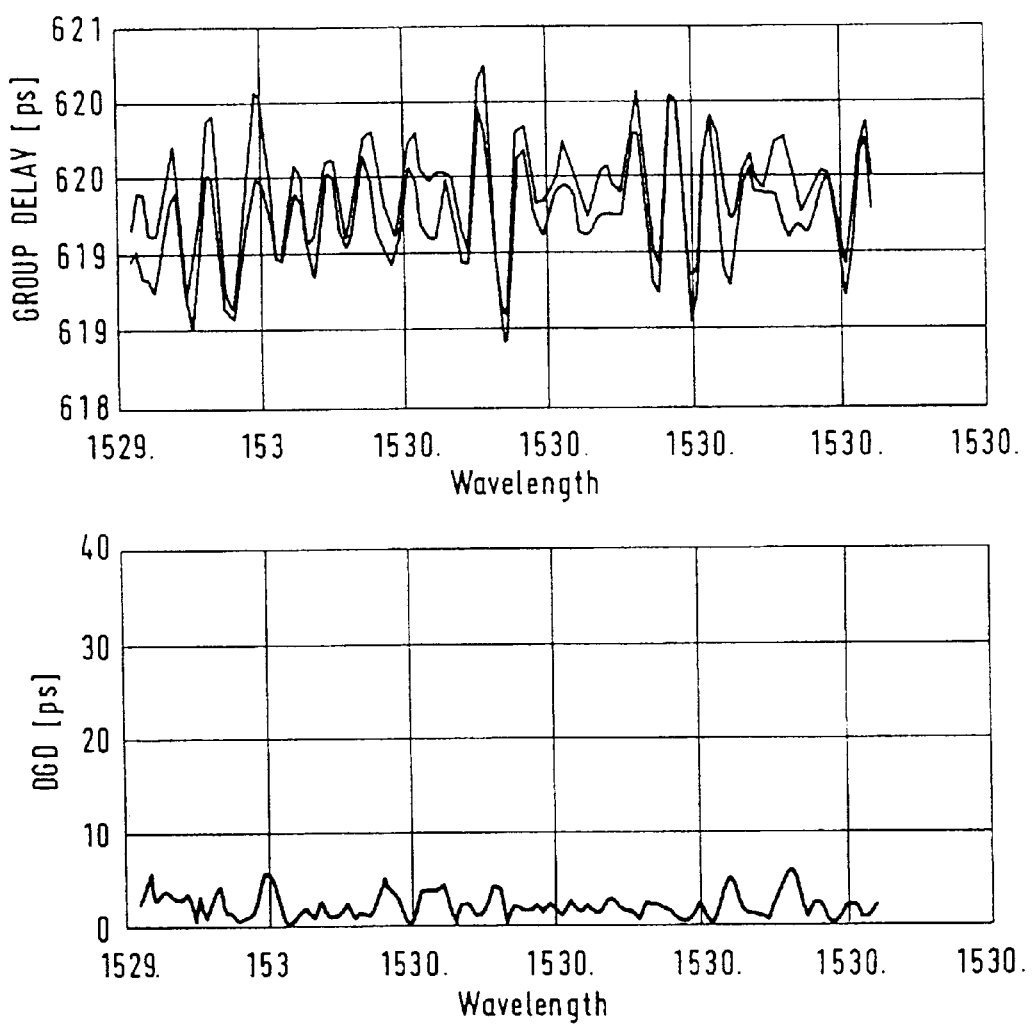

FIG. 3 shows a measurement with the above-described method without DUT 2 in the apparatus of FIG. 1.

In FIG. 3 the upper plot shows the group delay of the two principal axes. The abscissa shows the wavelength in nm and the ordinate shows the group delay in ps. The lower plot shows the difference between the two group delays, the DGD in ps over the wavelength in nm. As expected the DGD is closer to zero. Marked deviations from the ideal value however can be seen, which permits an assessment of the measurement accuracy of the apparatus 1 of the present invention of a few picoseconds. For the description of these parts reference is made to the description of embodiment 1 of FIG. 1.

Figure 4:
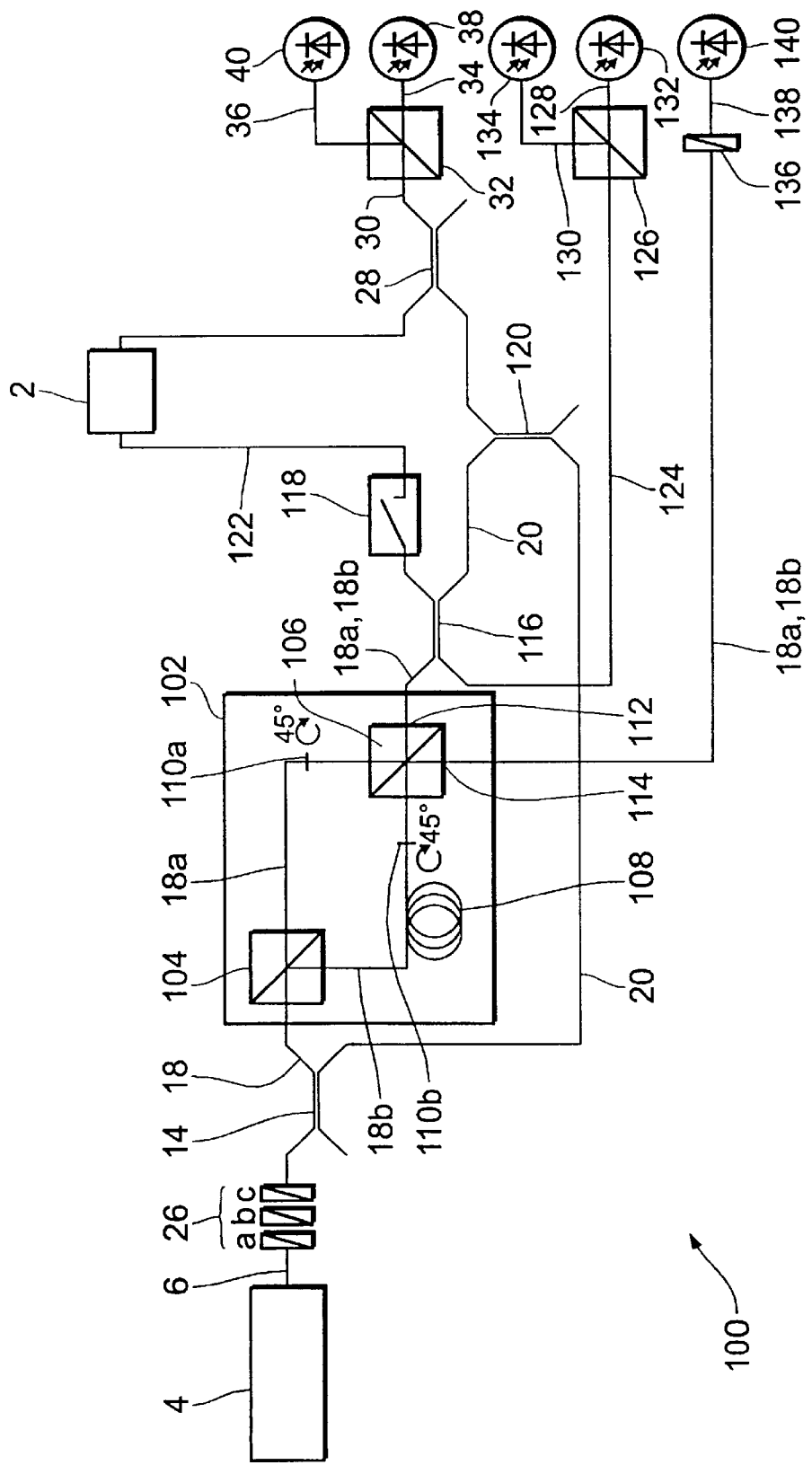
FIGS. 4–10 show schematic illustrations of further embodiments of the invention.

FIG. 4 shows a schematic illustration of a second embodiment 100 of the present invention. The main difference between embodiment 100 of FIG. 4 and embodiment 1 of FIG. 1 is the introduction of a polarization delay unit (PDU) 102 in the path of the third laser beam 18. The PDU 102 is introduced in the path of the third laser beam 18 between the second beam splitter 14 and the DUT 2. The PDU 102 contains a first polarization beam splitter (PBS) 104 and a second PBS 106. The first PBS 104 splits the third laser beam 18 into a first part 18a and a second part 18b. The paths of both parts 18a, 18b are provided by polarization maintaining fibers (PMF) to preserve the polarization of each part 18a, 18b, respectively. Subsequently, the first part 18a and the second part 18b are reunited by the second PBS 106. It is assumed that both PBS 104, 106 are manufactured with two ports of PMF and two ports of single-mode fiber (SMF). If the devices 104,106 are connected with standard-aligned connectors the light is guided completely to one port of the second PBS 106 and no light is coming out of the other port of the second PBS 106. Therefore, the PMFs of each beam 18a and 18b are rotated by 45° to produce an output on both ports of the second PBS 106.

However, the first part 18a and the second part 18b travel a different optical distance between the first PBS 104 and the second PBS 106 since beam 18b travels a longer distance symbolized by loops 108. This means that the second part 18b is delayed with respect to the first part 18a. Moreover, since both parts 18a, 18b are orthogonal to each other they do not interfere when being reunited by the second PBS 106.

The second PBS 106 has two outgoing ports 112 and 114. At both outgoing ports 112 and 114 the two parts 18a, 18b are present since they do not interfere with each other. In the path of the beams 18a, 18b leaving port 112 is a beam splitter 116, a shutter 118, the DUT 2, the beam splitter 28 and finally the PBS 32 connected with the detectors 38 and 40. To measure the optical properties of DUT 2 in transmission. At the beam splitter 28 the light of the two parts 18a, 18b is superimposed with the local oscillator light 20 as in embodiment 1 of FIG. 1. The local oscillator light 20 reaches the beam splitter 28 through a beam splitter 120. Therefore, both parts 18a and 18b and therefore both polarizations of the beam 18 are superimposed with the light 20 of the local oscillator. Therefore, both polarizations create interference patterns at the polarization diversity detectors 38 and 40 simultaneously. Due to the different propagation delays of the two input polarizations the two interference patterns are separated in the electrical spectrum. Hence a digital filter in the (not shown) evaluation unit can split the information belonging to each input polarization. As a consequence the second scan necessary in embodiment 1 of FIG. 1 with the orthogonal polarized beam 18 is not necessary in embodiment 100, advantageously.

Moreover, the DUT 2 can also be measured in reflection. To reach this goal there is provided the beam splitter 116 in the path of the reflected beam 122. The reflected beam 122 contains reflected parts of the parts 18a and 18b. The beam 122 containing these reflected parts of parts 18a and 18b is superimposed with the light of 20 of the local oscillator at beam splitter 116. The superimposed light 124 is then directed on a PBS 126 which splits the light into a beam 128 and a beam 130. Beam 128 is connected with a detector 132 and beam 130 is connected with a detector 134. By detectors 132 and 134 it is possible to measure the optical properties of DUT 2 in reflection. Moreover, based on the introduction of the PDU 102 it is possible to measure the optical properties of DUT 2 in reflection just with a single scan of the laser source 4 since the superimposed beam 124 also contains two parts, one part being the superposition of local oscillator light with part 18a and the second part being the superposition of the local oscillator light 20 with the second part 18b, the latter being delayed with respect to the first part 18a. Hence a digital filter can split the information belonging to each input polarization of each part 18a, 18b in the same way as it is done with the detectors 38 and 40 for the transmission measurement.

Instead of the reference interferometer 52 the second port 114 of the PBS 106 is used as a reference interferometer by detecting the outcoming light 18a, 18b through a PMF-connected polarizer 136 which makes the parts 18a and 18b interfere with each other so that there is produced a superimposed light beam 138 which shows an interference pattern which can be detected by a detector 140 connected with polarizer 136. Therefore, it is possible to simplify the embodiment of FIG. 1 dramatically.

In embodiment 100 the input polarization of the system is critically influencing the measurement performance. Preferably, the input polarization should be chosen in a way that the light of the local oscillator path 6 is split equally onto the four detectors 38, 40, 132, 134. Therefore, the light hitting each PBS 104, 32, 126 has to be appropriately polarized to achieve a splitting ratio of 50%, preferably. The valid polarization states are located on a great circle on the Poincaré-sphere. Generally the orientation of this circle is different for each PBS 104, 32, 126. It is guaranteed that there are two intersections of each two of these circles which produce a 50% splitting ratio on the corresponding PBS. In most cases there is no intersection of all three circles. Therefore, a splitting ratio of 50% at all PBS 104, 32, 126 cannot be guaranteed. It turns out that even for the worst-case condition an acceptable compromise with splitting ratios unequal to 50% can be found. The worst-case condition corresponds to a 22.5° misaligned linear polarization state of the input polarization of the PDU 102. In this worst-case a minimum splitting ratio of $\sin^2(25.5°)=15\%$ occurs which still leads to a well acceptable contrast of the interference patterns. The optimum input polarization of the PDU 102 has to be found during an initialization procedure (see below).

Figure 5:
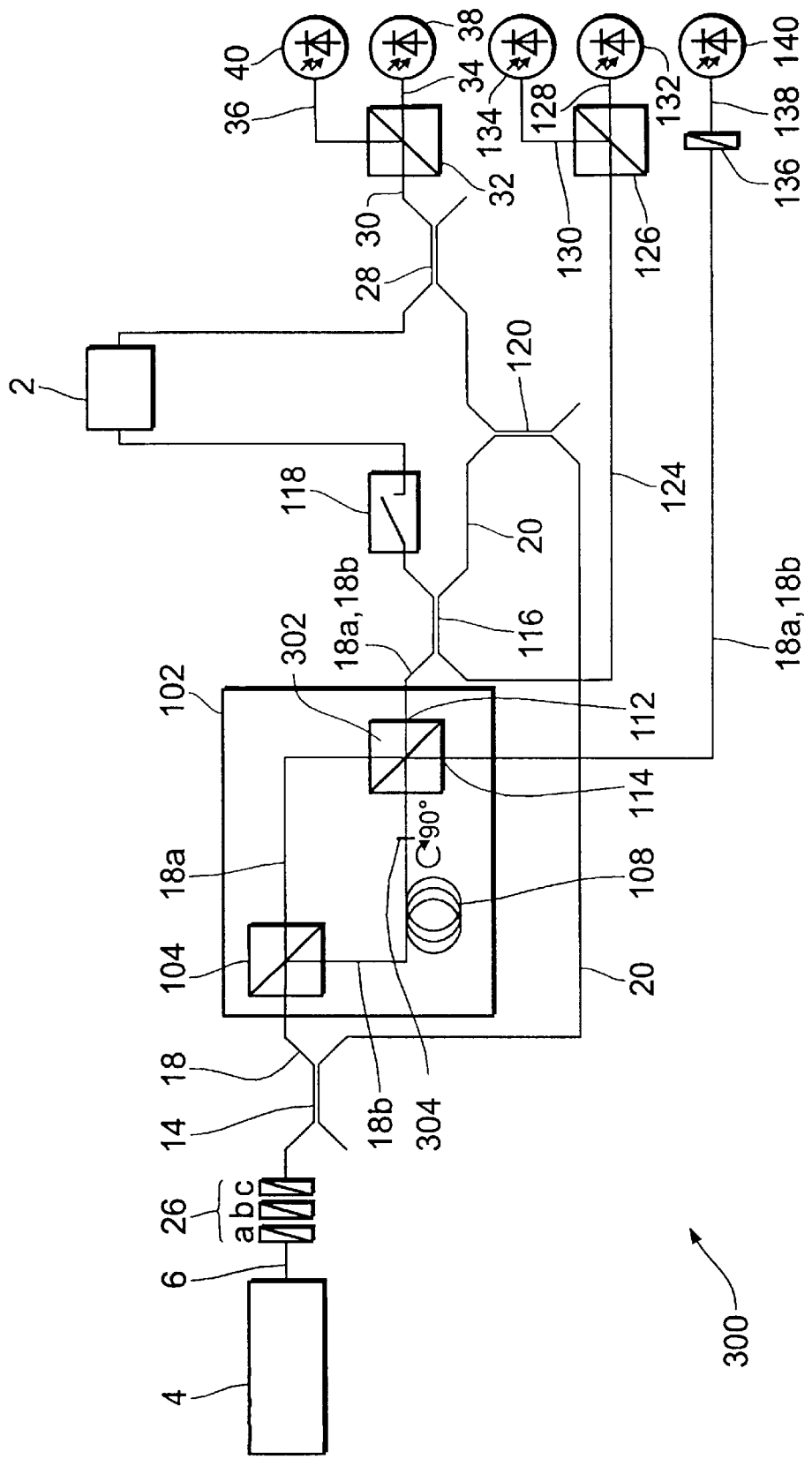

FIG. 5 shows a third embodiment 300 of the present invention.

As a difference to the embodiment 100 of FIG. 4 in the embodiment 300 of FIG. 5 the PBS 106 is replaced by a polarization maintaining coupler 302. Therefore, both output ports 112 and 114 emit the same signal. The use of the output signals of the output ports 112, 114 is the same as in embodiment 100 of FIG. 4. In the PDU 102 only the longer path 18b has to be rotated by 90° as symbolized by symbol 304 because of the use of the polarization maintaining coupler 302.

Figure 6:
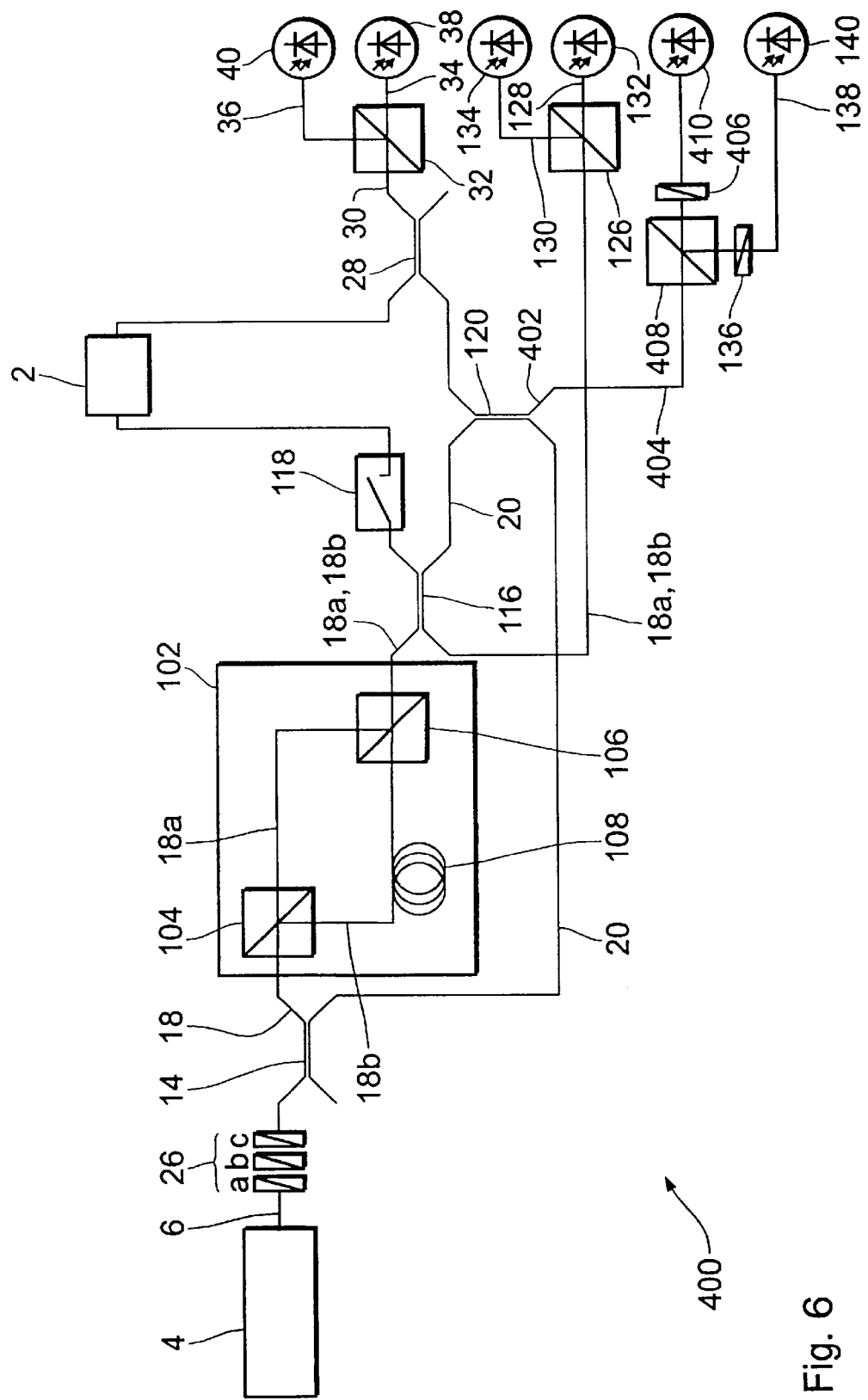

FIG. 6 shows a fourth embodiment 400 of the present invention. In FIG. 6 the set-up of the polarization delay unit 102 is the same as in embodiment 100 of FIG. 4. Different to embodiment 100 of FIG. 4 the second port 114 of the PBS 106 is not used for measurement of the wavelength of the local oscillator. Instead of that a port 402 of the beam splitter 120 which is not used in the embodiment 100 of FIG. 4 is used in embodiment 400 of FIG. 6 to tap off the input light of the DUT 2. Since the fiber 404 used to transport the signal from port 402 is a single mode fiber (SMF) the polarization is not preserved as the polarizer 136 cannot be orientated properly in any case. Therefore, a second polarizer 406 rotated by 45° with respect to the first polarizer 136 is used to provide an interference pattern in any case. To be able to use the second polarizer 406 a beamsplitter 408 is introduced in the fiber 404. The signal transmitted by the polarizer 406 is detected by a second detector 410.

Figure 7:
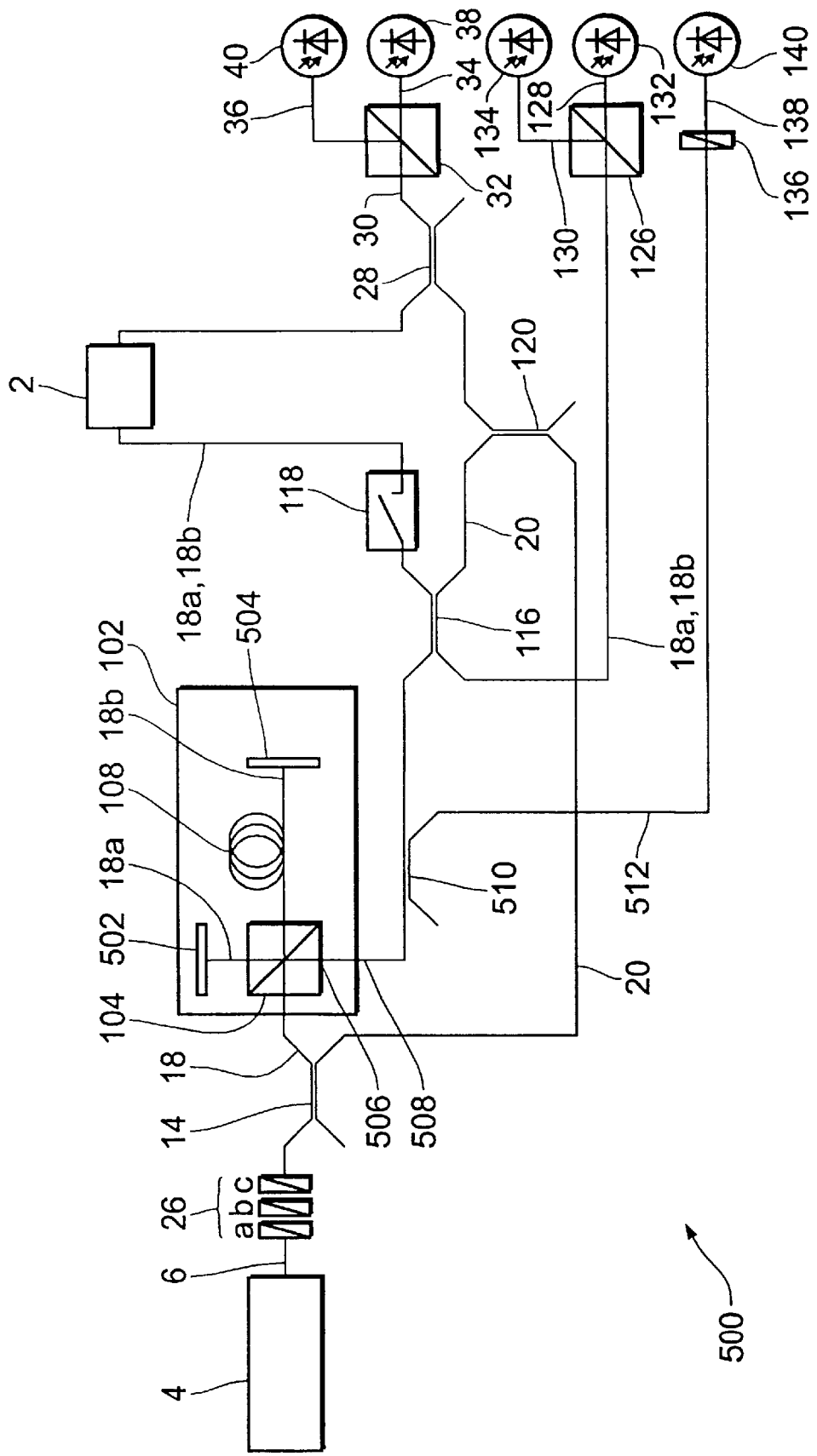

FIG. 7 shows a schematic illustration of a fifth embodiment 500 of the present invention. Embodiment 500 is similar to the embodiment 100 of FIG. 4.

However, in embodiment 500 of FIG. 7 the PDU 102 shows a different set-up. Instead of the second PBS 106 there are provided two Faraday mirrors 502 and 504. Using the Faraday mirrors 502, 504 avoids the need of long pieces of PMF inside the PDU 102 which can cause problems if the polarization is not properly aligned to the axis of the PMF. The incoming light beam 18 is split into two linear polarizations states (SOP) by the first PBS 104 and travels along the SMF before it is reflected by the Faraday mirrors 502, 504, respectively. In contrast to regular mirrors the Faraday mirrors 502, 504 transform each incoming SOP into an orthogonal, reflected polarization state. Thus the light is emitted through the fourth port 506 of the PBS 104 without the need of a circulator. Using the PBS 104 also to recombine the reflected light reflected by the Faraday mirrors 502, 504 guarantees that the two delayed components are orthogonal polarized and do not interfere. If the Faraday mirrors 502, 504 do not generate perfectly orthogonal polarization states a small fraction of the light is reflected back to the laser source 4 and does not disturb the signal path.

The output port 506 of the PBS 104 is connected to a PMF 508 to transport the parts 18a, 18b to the DUT 2 in the same way as in the embodiment 100 of FIG. 4.

A PMC 510 is used to tap off some light which is fed through the polarizer 136 to generate the wavelength reference signal. Since neither a 45° connection nor a 90° connection between the two PMFs is needed, this set-up can be realized using commonly aligned polarization maintaining connectors.

Moreover, it is possible to introduce a power detector in each path 18a, 18b in the PDU 102 of the embodiment 500 of FIG. 7 to measure if the power is distributed in each part 18a, 18b equally (not shown in FIG. 7).

Before the DUT 2 is connected into the apparatus 500 of FIG. 7 the two photo detectors 38, 40 are used, together with a (not shown) feedback circuit, to ensure equal splitting of the local oscillator light 6 by the PBS 32. This is done by opening the optical shutter 118 and using the control circuit to adjust the polarization controller 26 properly.

To measure the power of each polarization 18a, 18b hitting the DUT 2, the DUT 2 is replaced by a standard single-mode fiber and the experiment is run as described before. The total power in each polarization 18a, 18b can be determined by summing the signals on the two photodiodes 38, 40. Since the standard single mode fiber is assumed to be independent of polarization dependent loss (PDL) the power in each frequency of the interference signal represents the power in one of the polarizations of the parts 18a, 18b.

Figure 8:
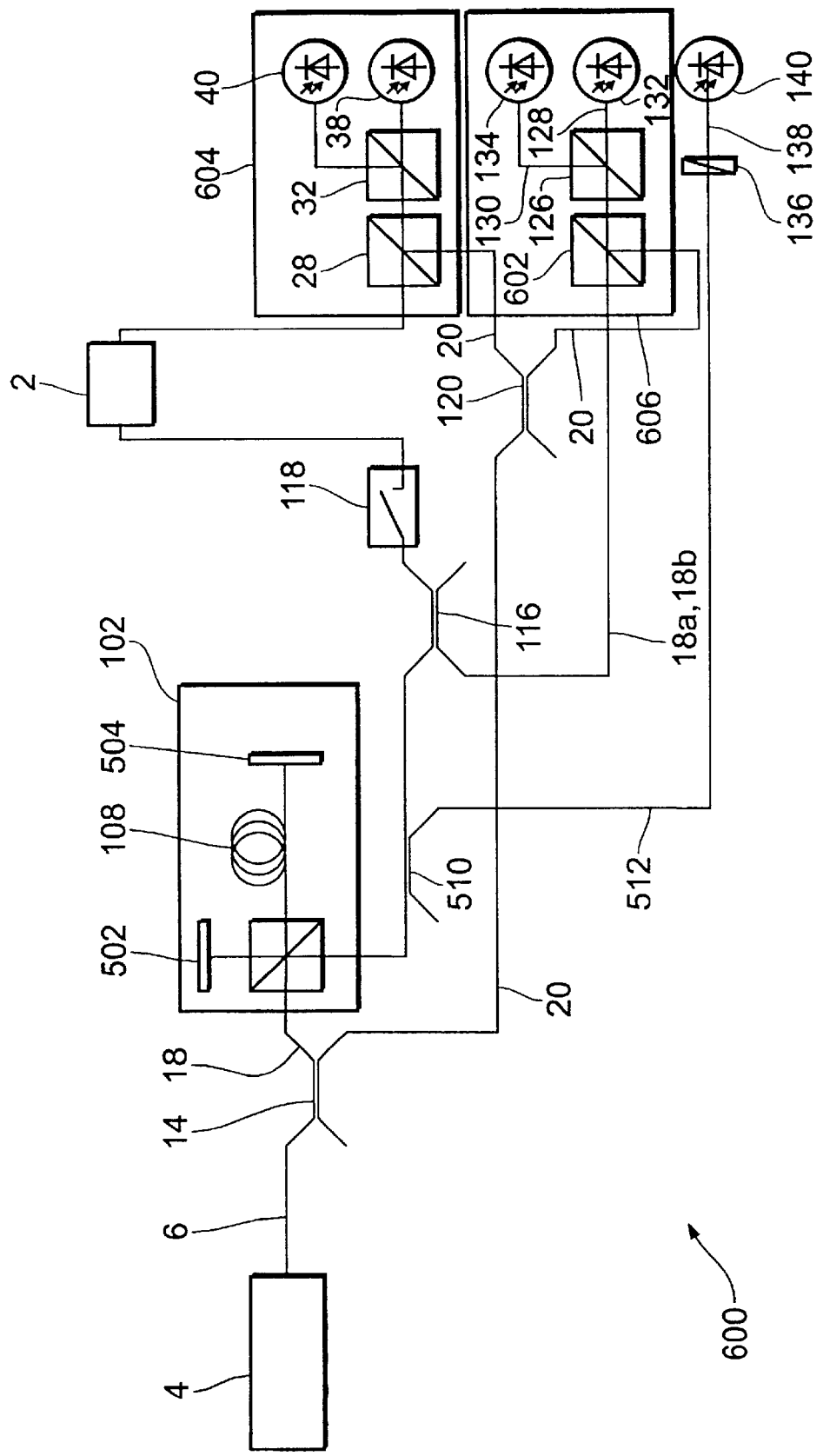

FIG. 8 shows a schematic illustration of a sixth embodiment 600 of the present invention. As a difference to embodiment 500 in embodiment 600 all reference paths and the path to the PDU 102 are built up by PMF. Moreover, the local oscillator light 20 is not superimposed with the reflected parts 18a, 18b at the beam splitter 116. In this embodiment 600 the local oscillator light 20 is superimposed with reflected parts 18a, 18b in a beam splitter 602 before the light enters the beam splitter 126. In embodiment 600 the polarization diversity receivers 604, 606 are preferably realized in bulk-optics to avoid problems with PMF in the DUT-path.

Figure 9:
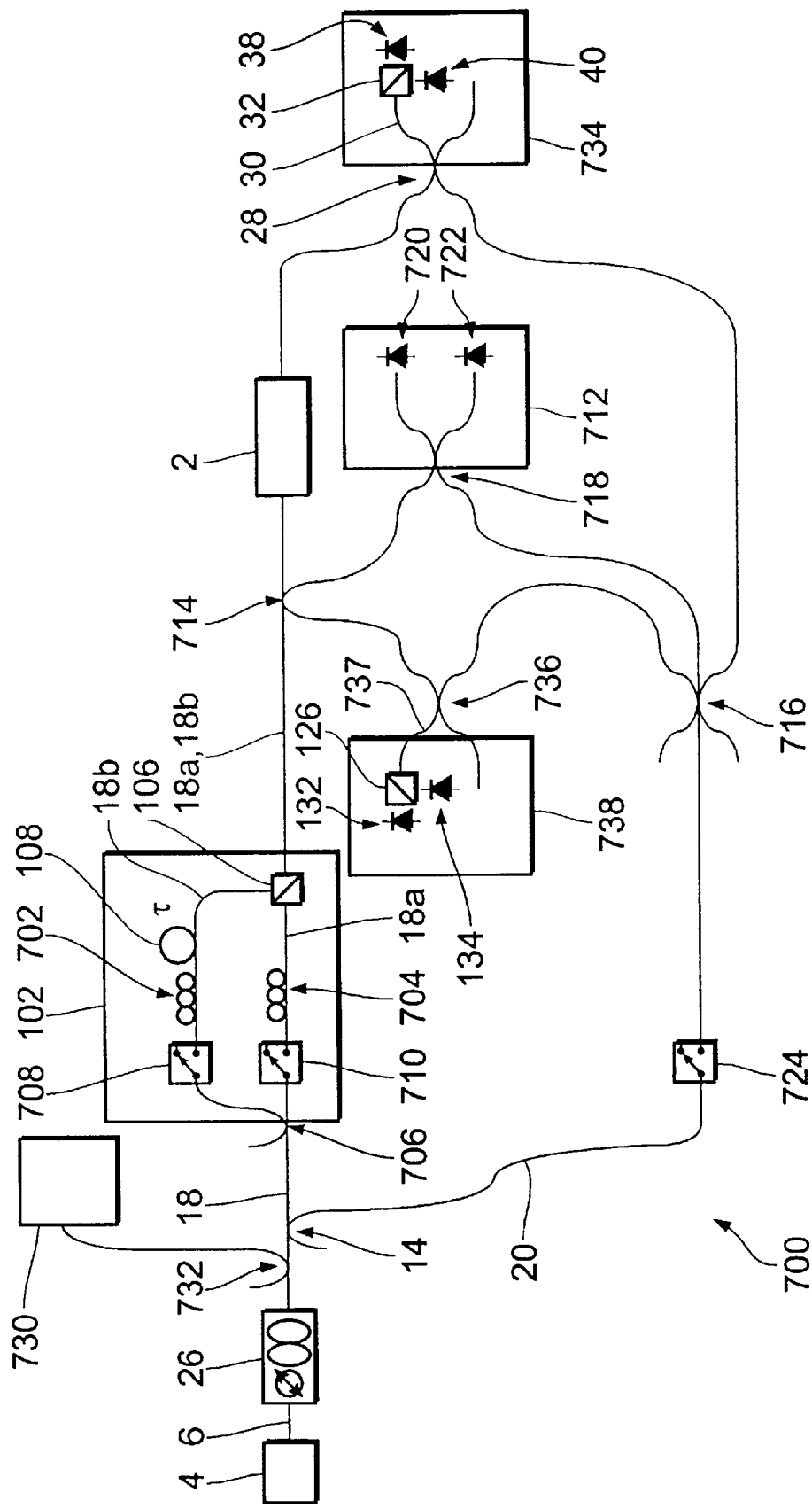

FIG. 9 shows a schematic illustration of a seventh embodiment 700 of the present invention. The differences of embodiment 700 with respect to embodiment 100 of FIG. 4 are as follows: The PDU 102 contains no PBS 104. Instead of that PDU 102 contains polarization setting tools 702 and 704 in the paths 18a and 18b of PDU 102. The path 18 is split into paths 18a and 18b by a beam splitter 706. In each path 18a, 18b there is provided a switch 708, 710. Paths 18a, 18b are combined by PBS 106.

Additionally, embodiment 700 contains a phase calibration unit (PCU) 712. The PCU 712 superimposes parts 18a, 18b provided by a beam splitter 714 with the reference signal 20 provided by a three port beam splitter 716 with the help of a beam splitter 718. The superimposed signal is split again by the beam splitter 718 and detected by two photodiodes 720 and 722 of the PCU 712.

Beam splitter 28, path 30, beam splitter 32 and detectors 38 and 40 build up a transmission receiver 734. Beam splitter 736, path 737, beam splitter 126 and detectors 132 and 134 build up a reflection receiver 738.

A switch 724 is provided in the reference arm 20 to cut off the reference signal. Switches 708, 710 and 724 are not necessary to perform the inventive method.

One advantage of using the PCU 712 shall be explained by the following: Using the "single-scan" technique, it is possible that multiple interference frequencies (the number varies depending on which architecture is chosen) are observed in the power spectrum of the received data. By applying a bandpass around each one of the peaks individually, one is able to recover information about the element of the Jones matrix associated with that interference peak. The filtered interference peak of, for example, associated with the first Jones matrix element has the amplitude and phase given by the expression $$|U_{xx}||E_x||E_{LOx}|\cos(\omega\tau_{xx}+\Phi_{xx}).$$

The filtered interference peak of the second Jones matrix element, however, can have a different amplitude and phase, given by $$|U_{yx}||E_y||E_{LOx}|\cos(\omega\tau_{yx}+\Phi_{yx}).$$

The difficulty arises because delays, $\tau_{xx}$ and $\tau_{yx}$ are different. The Jones matrix should have the structure, $$e^{j\omega\tau}\begin{pmatrix} U_{xx}e^{j\varphi_{xx}} & U_{yx}e^{j\varphi_{yx}} \\ U_{xy}e^{j\varphi_{xy}} & U_{yy}e^{j\varphi_{yy}} \end{pmatrix},$$

$\tau$ is an arbitrary delay. In order to accomplish this, however, one should, among other things, know the difference $\omega(\tau_{xx}-\tau_{yx})$. This should be known with a precision of a few femtoseconds in order to ensure maximum accuracy of the measurement. One of the best ways to do this is to measure the beat frequencies of the two delayed signals with the LO before they have passed through the DUT 2. This is done by the PCU 712. In that case (e.g. as in architectures 700 and 800 of FIGS. 9 and 10), the interference signals corresponding to those of the embodiments above would, assuming that there is no significant PMD, be at least approximately proportional to $\cos(\omega\tau_{xx})$ and $\cos(\omega\tau_{yx})$ respectively. From these signals it is possible to determine the difference $\omega(\tau_{xx}-\tau_{yx})$. This allows to replace $|U_{yx}||E_y||E_{LOx}|\cos(\omega\tau_{yx}+\Phi_{yx})$ with the modified signal $|U_{yx}||E_y||E_{LOx}|\cos(\omega\tau_{xx}+\phi_{yx})$. Performing the same procedure on all of the interference signals allows to create a Jones matrix with the form shown above, $$e^{j\omega\tau_{xx}}\begin{pmatrix} U_{xx}e^{j\varphi_{xx}} & U_{yx}e^{j\varphi_{yx}} \\ U_{xy}e^{j\varphi_{xy}} & U_{yy}e^{j\varphi_{yy}} \end{pmatrix}.$$

It is preferred to measure the difference $\omega(\tau_{xx}-\tau_{yx})$ by the PCU 712 simultaneous with the measurement being performed for at least the following reasons. 1) Due temperature or strain fluctuations, the value measured at one time may be incorrect at another time. In fact, even though any inaccuracy would be relatively small, it could be enough to make the PMD measurements worse. 2) Much of the errors that could occur in these systems are due to acoustic or vibration noise which can perturb the interferometer and can give noisy phase measurements. Since the light traverses very similar paths for both the phase calibration by PCU 712 and the transmission receiver measurements by detectors 38 and 40, the acoustic noise measured at both locations can be similar. Consequently, it is possible to use the phase calibration receiver 712 to compensate for vibration and acoustic noise in the measurement of the DUT 2.

Figure 10:
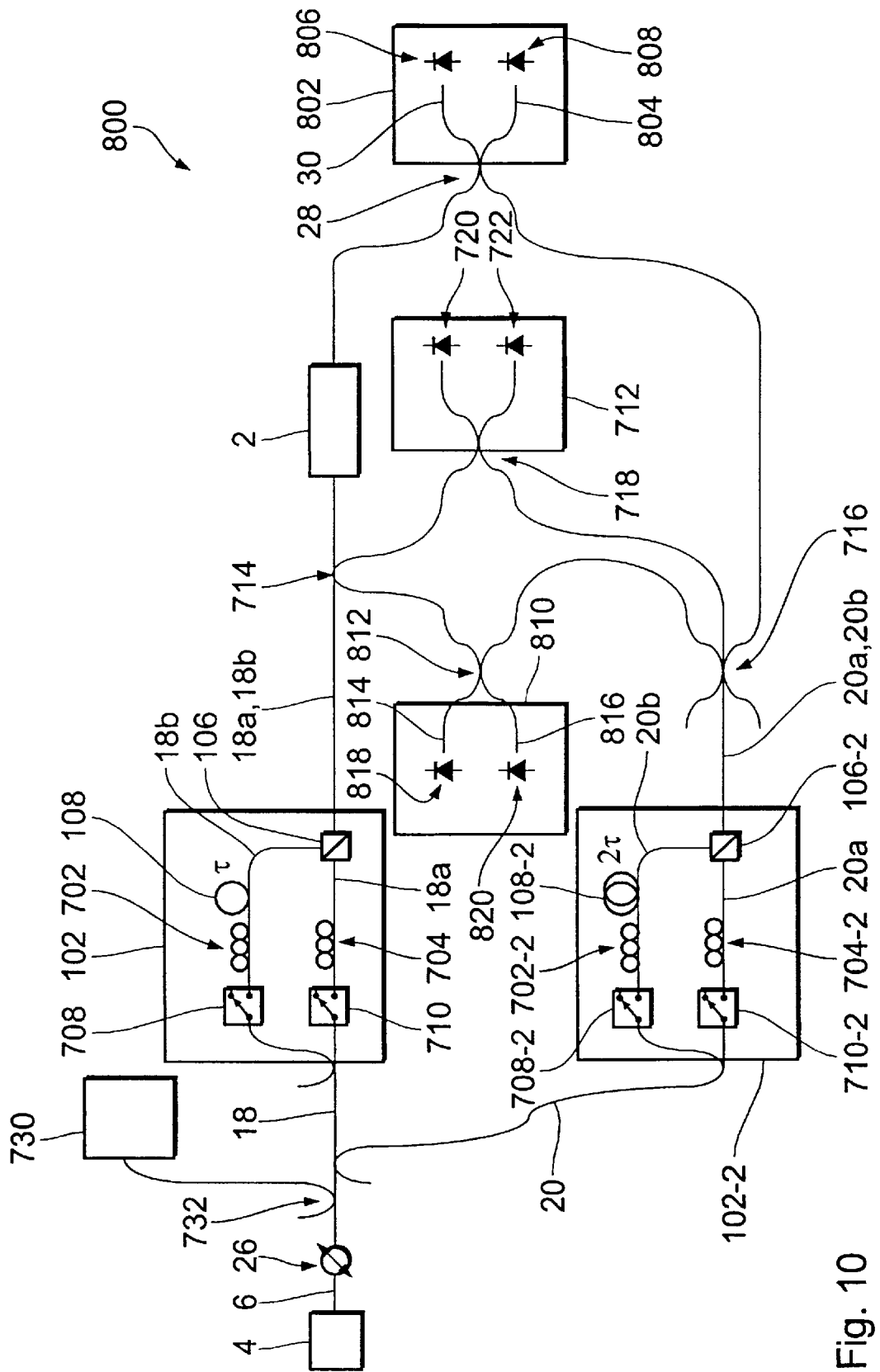

FIG. 10 shows a schematic illustration of an eighth embodiment 800 of the present invention. Embodiment 800 uses a second PDU 102-2 in the reference arm 20. This second PDU 102-2 produces in the same manner as PDU 102 two parts 20a, 20b of the reference signal 20 which parts 20a, 20b are delayed with respect to each other. However, PDU 102-2 contains a different loop 108-2 which doubles the delay of the delayed part 20b with respect to the undelayed part 20a. An advantage of the second PDU 102-2 in LO path is as follows: In the double-sweep technique of FIG. 1 for determining the Jones matrix, the polarizing beam splitter 32 is used before the transmission receiver 38 to define an output $\hat{x}$ and $\hat{y}$ axis. In other words, the $\hat{x}$ component of the output light from the DUT 2 is directed to receiver 38 where the interference is recorded and used to determine a Jones matrix element. Likewise, the $\hat{y}$ component of the output from the DUT 2 is directed to the other receiver 40 and measured. If an $\hat{x}$ polarized light were originally input to the DUT 2, then the $\hat{x}$ polarized output detector 38 would provide information about the $U_{xx}$ Jones matrix element. Likewise, the $\hat{y}$ polarized output detector 40 would provide information about the $U_{xy}$ element.

When there is introduced a second PDU into the LO path as in embodiment 800, the two orthogonal launched polarizations can be used to define the output $\hat{x}$ and $\hat{y}$ axes. In other words, the light that travels the short LO PDU 102-2 path 20a is defined to be $\hat{x}$ polarized at the receiver, and the light that travels the longer path 20b is defined to have a $\hat{y}$ polarization at the output. Both of the two orthogonal lightwaves transmitted from the DUT 2 PDU 102 will interfere with each of the two lightwaves from the LO PDU 102-2. This will create, if done properly, four distinct interference frequencies. Each one of these interference frequencies carries information about one element of the Jones matrix.

For example, if light from the short path 18a of the DUT 2 PDU 102 is defined to be $\hat{x}$ polarized and light from the short path 20a of the LO PDU 102-2 to be $\hat{x}$ polarized, then the lowest interference frequency will carry information about the fraction of $\hat{x}$ polarized input light that is also $\hat{x}$ polarized at the output. This information, therefore, can be used to determine the $U_{xx}$ element of the Jones matrix. Each interference frequency can likewise be assigned to a Jones matrix element.

Additionally, embodiment 800 of FIG. 10 contains no PBS 32 and 126 since this is not necessary any more when using a second PDU 102-2 as explained above.

Besides that, embodiment 800 of FIG. 10 uses two photodiodes in each receiver. This means that a transmission receiver 802 of embodiment 800, built up by beam splitter 28, a resulting path 30 and a second resulting path 804 detects both parts 30, 804 with two photodiodes 806 and 808. Similarly, a reflection receiver 810 built up by a beam splitter 812 detects both parts 814 and 816 provided by beam splitter 812 by respective photodiodes 818 and 820.

One of the advantages of two photodiodes 720, 722, 806, 808, 818, 820 in the receivers 712, 802, 810 is: In most measurements, the laser power emitted by the tunable laser 4 has small noisy fluctuations called relative intensity noise (RIN). These noise fluctuations can have a broad frequency content which can extend into the range of the frequencies that are tried to be measured. The end result can be simply noise fluctuations in the measurement of group delay, insertion loss, PDL, etc. It probably will be a fairly small effect, but it is preferred to make measurements that are very precise, so even small effects can be important. This noise can be eliminated using the inventive solution involving two photodiodes 720, 722, 806, 808, 818, 820. Here is how the inventive solution works: Two lightwaves, $E_1=E_{01}e^{j\omega t}$ and $E_2=E_{02}e^{j\omega(t+\tau)}$, mix in the coupler to obtain the intensity $I_1(t)$ at the first output port, where, $I_1=|E_1+E_2|^2=E_{01}^2+E_{02}^2+2|E_1||E_2|\cos\omega\tau$.

The intensity in the other arm would be $I_2=|E_1-E_2|^2 = E_{01}^2+E_{02}^2-2|E_1||E_2|\cos\omega\tau$. Now, the RIN is incorporated into the discussion by rewriting the two lightwaves as $E_1=(E_{01}+N_1)e^{j\omega t}$ where $N_1$ represents the relative intensity noise on lightwave 1 and $E_2=(E_{02}+N_2)e^{j\omega(t+\tau)}$ where $N_2$ represents the relative intensity noise on lightwave 2. When the two lightwaves are added together in a coupler, the intensity measured by a photodiode on one arm is: $I_1=|E_1+E_2|^2=E_{01}^2+E_{02}^2+2|E_1||E_2|\cos\omega\tau+2E_{01}N_1+2E_{02}N_2+N_1^2+N_2^2$. Due to the way the coupler operates on the light, the intensity of the light in the other arm is given by: $I_2=|E_1-E_2|^2=E_{01}^2+E_{02}^2-2|E_1||E_2|\cos\omega\tau+2E_{01}N_1+2E_{02}N_2+N_1^2+N_2^2$.

Clearly then, the noise can be removed through a simple subtraction of the intensities measured at the two output arms of the coupler. The result is:

$$I_1-I_2=4|E_1||E_2|\cos\omega\tau.$$

Since in these interferometric techniques, one should be mostly concerned about the interference term, subtraction is a convenient way to eliminate RIN.

Both embodiments 700 and 800 contain a wavelength reference unit (WRU) 730 located upstream of the beam splitter 14 and connected by a beam splitter 732 to the path of the beam 6. WRU 730 measures the wavelength of the beam 6 as a reference for the evaluation steps of the invention to further enhance the accuracy of the evaluated results. However, the WRU is not necessary to perform the invention.

What is claimed is:

1. A method of determination of a property of an optical device under test, comprising:
    splitting an incoming light beam into a first light beam and a second light beam,
    coupling the first light beam with defined polarization into the optical device under test,
    letting the second light beam travel a different path from the first light beam,
    superimposing the first and the second light beam to produce interference between the first light beam and the second light beam in a resulting superimposed light beam,
    detecting the power of the superimposed light beam as a function of frequency and polarization when tuning the frequency of the incoming light beam, over a given frequency range, and
    deriving the optical property of the optical device under test from the frequency dependence of the detected powers.

2. The method of claim 1, further comprising:
    splitting the superimposed light beam in a polarization dependent manner into a third light beam and a fourth light beam, and
    detecting the power of the third light beam and the fourth light beam as a function of frequency when tuning the frequency of the incoming light beam over a given frequency range.

3. The method of claim 1, further comprising:
    deriving elements of the Jones matrix for the optical device under test from the frequency dependence of the detected powers.

4. The method of claim 1, further comprising:
    changing the polarization of the first light beam with respect to said defined polarization into a changed polarization,
    performing the steps of claim 1 a second time with said changed polarization.

5. The method of claim 1, further comprising:
    setting the polarization of the first light beam after splitting the incoming light beam, or
    setting the polarization of the incoming light beam before splitting it.

6. The method of claim 4, further comprising:
    changing the polarization of the first light beam into an orthogonal polarization.

7. The method of claim 4, further comprising:
    making the defined polarization a linear polarization.

8. The method of claim 4, further comprising:
    splitting the incoming light beam into a first initial light beam and a second initial light beam,
    performing the steps of claim 1 with said first initial light beam,
    splitting the second initial light beam into a fifth light beam and a sixth light beam,
    superimposing the fifth and the sixth light beam after each light beam has traveled a different path, to produce interference between the fifth and the sixth light beam in a resulting superimposed light beam,
    detecting the power of the resulting superimposed light beam as a function of frequency when tuning the frequency of the incoming light beam over a given frequency range,
    detecting a nonlinearity in the tuning rate of the incoming light beam over the given frequency range, and
    when detecting a nonlinearity, using said detected nonlinearity information to compensate effects on the detected powers of the third and the fourth light beam caused by said nonlinearity.

9. The method of claim 1, further comprising:
    splitting the first light beam into a first part and a second part,
    delaying the second part relative to the first part,
    recombining the first and the second part, and
    coupling the recombined parts with different polarizations into the optical device under test.

10. The method of claim 9,
    whereby the polarizations of the parts are at least approximately orthogonal to each other.

11. The method of claim 9, wherein each recombined part comprises at least approximately 50% of the power of the coherent light beam.

12. The method of claim 9, further comprising:
    filtering a peak in the spectrum of detected powers,
    allocating the peak in the spectrum to the respective part, and
    deriving optical properties of the optical device under test from the frequency and polarization dependence of the detected powers.

13. The method of claim 9, further comprising:
    producing interference between the recombined parts in a resulting superimposed light beam,
    continuously detecting the power of the resulting superimposed light beam as a function of frequency when tuning the frequency of the incoming light beam over a given frequency range,
    detecting a nonlinearity in a tuning gradient frequency when tuning the frequency of the incoming light beam over the given frequency range, and
    when detecting a nonlinearity, using said detected nonlinearity information to compensate for effects on the detected powers of the third and the fourth light beam caused by said nonlinearity.

14. The method of claim 13, further comprising:

producing interference by superimposing the recombined parts by polarizing the recombined parts.

15. The method of claim 4, further comprising at least one of the following steps:

deriving the polarization mode dispersion of the device under test from the information obtained through the measurement, preferably represented as Jones matrix elements of the device under test, deriving the chromatic dispersion of the device under test from the Jones matrix elements of the device under test, deriving the principal states of polarization of the device under test from the Jones matrix elements of the device under test, deriving the polarization dependent loss of the device under test from the Jones matrix elements of the device under test, deriving the fast and slow group delays, associated with the fast and slow principal states of polarization of the device under test from the Jones matrix elements of the device under test, deriving the insertion loss of the device under test from the Jones matrix elements of the device under test, deriving the transmissivity of reflectivity of the device under test from the Jones matrix elements of the device under test, and deriving higher-order polarization mode dispersion parameters, such as the rate of change of the differential group delay with frequency, from the Jones matrix elements of the device under test.

16. The method of claim 9, further comprising:

splitting the first light beam into a first and a second part in a polarization dependent manner.

17. An apparatus for determination of optical properties of an optical device under test, comprising:

a first beam splitter in a path of an incoming light beam for splitting the incoming light beam into a first light beam traveling a first path and a second light beam traveling a second path, wherein the optical device under test can be coupled in said first path for coupling in the first light beam with a defined polarization, a second beam splitter in said first and in said second path for superimposing the first and the second light beam after the second light beam has traveled a different path as the first light beam, to produce interference between the first light beam and the second light beam in a resulting superimposed light beam traveling a resulting path, a detector unit in said resulting path for detecting the power of the resulting superimposed light beam traveling the resulting path as a function of frequency and polarization when tuning the frequency of the incoming light beam over a given frequency range, and an evaluation unit for deriving optical properties of the optical device under test from the frequency dependency of the detected powers.

18. The apparatus of claim 17, comprising:

a polarization beam splitter in said resulting path for splitting the superimposed light beam in a polarization dependent manner into a third light beam traveling a third path and a fourth light beam traveling a fourth path, a first power detector in said third path for detecting the power of the third light beam as a function of frequency when tuning the frequency of the incoming light beam over a given frequency range, and a second power detector in said fourth path for detecting the power of the fourth light beam as a function of frequency when tuning the frequency of the incoming light beam over a given frequency range.

19. The apparatus of claim 17, comprising an evaluation unit for deriving elements of the Jones matrix of the optical device under test from the frequency dependence of the detected powers.

20. The apparatus of claim 17, wherein the first beam splitter, and the second beam splitter comprise a Mach-Zehnder interferometer and/or a Michelson interferometer.

21. The apparatus of claim 17, further comprising a polarization setting tool positioned in said first path for adjusting the polarization of the first light beam to the defined polarization, wherein the polarization setting tool is positioned in the path of the incoming light beam before or after the first beam splitter.

22. The apparatus of claim 17, wherein the polarization setting tool is adjusting the polarization of the respective beam in a linear manner.

23. The apparatus of claim 17, further comprising:

a third beam splitter in the path of the incoming light beam for splitting the incoming light beam into a first initial light beam traveling a first initial path and a second initial light beam traveling a second initial path, a fourth beam splitter in said second initial path for splitting the second initial light beam in a fifth light beam traveling a fifth path and a sixth light beam traveling a sixth path, a fifth beam splitter in said fifth and said sixth path for superimposing the fifth and the sixth light beam after each light beam has traveled a different path, to produce interference between the fifth and the sixth light beam in a resulting superimposed light beam traveling a second resulting path, a third power detector in said second resulting path for detecting the power of the resulting superimposed light beam as a function of frequency when tuning the frequency of the incoming light beam over a given frequency range, whereby an output of the power detector is connected with the evaluation unit for detecting any nonlinearity in a tuning gradient frequency when tuning the frequency of the coherent light beam over the given frequency range, and in case evaluation unit is detecting any nonlinearity, the evaluation unit is using said detected nonlinearity information to compensate effects on the detected powers of the third and the fourth light beam caused by said nonlinearity.

24. The apparatus of claim 17, further comprising:

a polarization delay unit for:

splitting the first light beam into a first part and a second part, delaying the second part relative to the first part, recombining the first and the second part, providing the recombined parts with different polarizations for coupling into the optical device under test.

25. The apparatus of claim 24, wherein the polarization delay unit comprises a first polarization beam splitter for splitting the first light beam into a first part and a second part.

26. The apparatus of claim 24, wherein the polarization delay unit comprises a second polarization beam splitter for recombining the first part and the second part.

27. The apparatus of claim 24, wherein the polarization delay unit comprises a first optical path for the first part and a second optical path for the second part, the second path having a longer optical length than the first path, for delaying the second part relative to the first part.

28. The apparatus of claim 24, wherein the polarization delay unit comprises a polarizing device for providing the recombined parts with different polarizations for coupling into the optical device under test.

29. The apparatus of claim 24, wherein the polarization delay unit comprises a device for providing the recombined parts with different polarizations to a polarizer to produce interference between the parts in a resulting superimposed light beam traveling a resulting path, the apparatus further comprising a power detector in said resulting path for detecting the power of the resulting superimposed light beam as a function of frequency when tuning the frequency of the coherent light beam over a given frequency range, whereby an output of the power detector is connected with the evaluation unit for detecting any nonlinearity in a tuning gradient frequency when tuning the frequency of the incoming light beam over the given frequency range, and in case evaluation unit is detecting any nonlinearity, the evaluation unit is using said detected nonlinearity information to compensate effects on the detected powers of the third and the fourth light beam caused by said nonlinearity.

30. The apparatus of claim 29, wherein the device further comprises:

an output port of the second polarization beam splitter not to be connected with the optical device under test, or a polarization maintaining coupler to be connected with the output port of the second polarization beam splitter to be connected with the optical device under test, or at least one beam splitter to be connected with the output port of the second polarization beam splitter to be connected with the optical device under test.

* * * * *